US012558950B2

(12) United States Patent
Engineer et al.

(10) Patent No.: US 12,558,950 B2
(45) Date of Patent: Feb. 24, 2026

(54) INTEGRATED INTERNAL COMBUSTION ELECTRIC MOTOR (ICEM) CONCEPT FOR HYBRID AND PLUG-IN HYBRID VEHICLE APPLICATION

(71) Applicant: ARAMCO SERVICES COMPANY, Houston, TX (US)

(72) Inventors: Nayan Engineer, Canton, MI (US); David Cleary, West Bloomfield, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 346 days.

(21) Appl. No.: 18/305,160

(22) Filed: Apr. 21, 2023

(65) Prior Publication Data

US 2024/0351422 A1 Oct. 24, 2024

(51) Int. Cl.
*B60K 6/26* (2007.10)
*B60K 6/24* (2007.10)
(Continued)

(52) U.S. Cl.
CPC .................. *B60K 6/26* (2013.01); *B60K 6/24* (2013.01); *B60K 6/365* (2013.01); *B60K 6/48* (2013.01); *B60K 2006/4825* (2013.01)

(58) Field of Classification Search
CPC . B60K 6/26; B60K 6/24; B60K 6/365; B60K 6/48; B60K 2006/4825
See application file for complete search history.

(56) References Cited

U.S. PATENT DOCUMENTS 5,120,282 A 6/1992 Fjallstrom
5,947,855 A * 9/1999 Weiss ..................... B60K 17/08
477/3
(Continued)

FOREIGN PATENT DOCUMENTS

CN 111572367 A 8/2020
CN 112224008 A 1/2021
(Continued)

OTHER PUBLICATIONS

Saroop, Agam et al., "Development of a Pre-Chamber Combustion System for the Magma xEV Engine"; SAE International; SAE Technical Paper 2022-01-0422; pp. 1-20; Mar. 29, 2022 (20 pages).
(Continued)

*Primary Examiner* — Jacob B Meyer
(74) *Attorney, Agent, or Firm* — Osha Bergman Watanabe & Burton LLP

(57) ABSTRACT
A hybrid machine includes an engine, a first and second motor, a first and second generator, and a first and second geartrain. The engine generates power from a combustion reaction and includes an intake port, a combustion chamber, a piston, a crankshaft, and an exhaust port. The intake port receives air from an external environment. The combustion chamber mixes the air with fuel to create a mixture that is ignited. The piston actuates to rotate the crankshaft. The exhaust port delivers exhaust gases out of the engine. The first and second motors respectively include a first and second hub that rotate from supplied power. The first and second generators respectively generate power when a first and second shaft rotate. A first and second geartrain respectively connect to the first and second motors, the first and second generators, and the crankshaft to transmit power to a first and second wheel.

19 Claims, 9 Drawing Sheets

(51) Int. Cl.
  *B60K 6/365* (2007.10)
  *B60K 6/48* (2007.10)

(56) References Cited

U.S. PATENT DOCUMENTS

| | | | |
|---|---|---|---|
| 6,330,871 B1 | 12/2001 | Jufuku et al. | |
| 8,640,801 B2 * | 2/2014 | Hennings | B60K 7/0007 180/65.6 |
| 9,114,804 B1 * | 8/2015 | Shukla | B60W 10/08 |
| 9,651,120 B2 * | 5/2017 | Morrow | F16H 3/727 |
| 9,656,659 B2 * | 5/2017 | Shukla | F16H 3/728 |
| 10,457,132 B2 | 10/2019 | Mackenzie et al. | |
| 11,465,445 B2 * | 10/2022 | Falls | B60K 17/08 |
| 11,933,392 B2 * | 3/2024 | Scalici | B60W 10/08 |
| 12,078,231 B2 * | 9/2024 | Steinberger | B60K 17/34 |
| 2003/0205422 A1 | 11/2003 | Morrow et al. | |
| 2020/0070638 A1 | 3/2020 | Flaxman | |
| 2020/0331526 A1 | 10/2020 | Flaxman | |
| 2024/0351422 A1 * | 10/2024 | Engineer | B60K 6/24 |

FOREIGN PATENT DOCUMENTS

| | | | | |
|---|---|---|---|---|
| DE | 10 2012 219 742 A1 | 5/2013 | | |
| JP | S6095238 A | 5/1985 | | |
| WO | WO-2024220536 A1 * | 10/2024 | | B60K 6/24 |

OTHER PUBLICATIONS

Schoeffmann, Wolfgang et al., "A Modular Gasoline Engine Family for Hybrid Powertrains: Balancing Cost and Efficiency Optimization"; SAE International; SAE Technical Paper 2020-01-0839; pp. 1-13; Apr. 14, 2020 (13 pages).

Yang, Dongsheng et al., "Development of 43% Brake Thermal Efficiency Gasoline Engine for BYD DM-i Plug-in Hybrid"; SAE International; SAE Technical Paper 2021-01-1241; pp. 1-10; Sep. 21, 2021 (10 pages).

Bassett, Michael et al., "Modular Hybrid Powertrain with Jet Ignition"; MTZ worldwide; vol. 81, Issue 11; pp. 74-79; Nov. 2020 (6 pages).

Carney, Dan, "Tech Tidbit: Why an "Obsolete" Pushrod Engine Design is Better Than Modern Overhead Cams"; DesignNews; May 10, 2021; <https://www.designnews.com/automotive-engineering/tech-tidbit-why-%E2%80%9Cobsolete% E2%80%9D-pushrod-engine-design-better-modern-overhead-cams>; Accessed Jan. 23, 2023 (12 pages).

International Search Report issued for corresponding international patent application No. PCT/US2024/024968, mailed Jul. 31, 2024 (6 pages).

Written Opinion issued for corresponding international patent application No. PCT/US2024/024968, mailed Jul. 31, 2024 (9 pages).

* cited by examiner

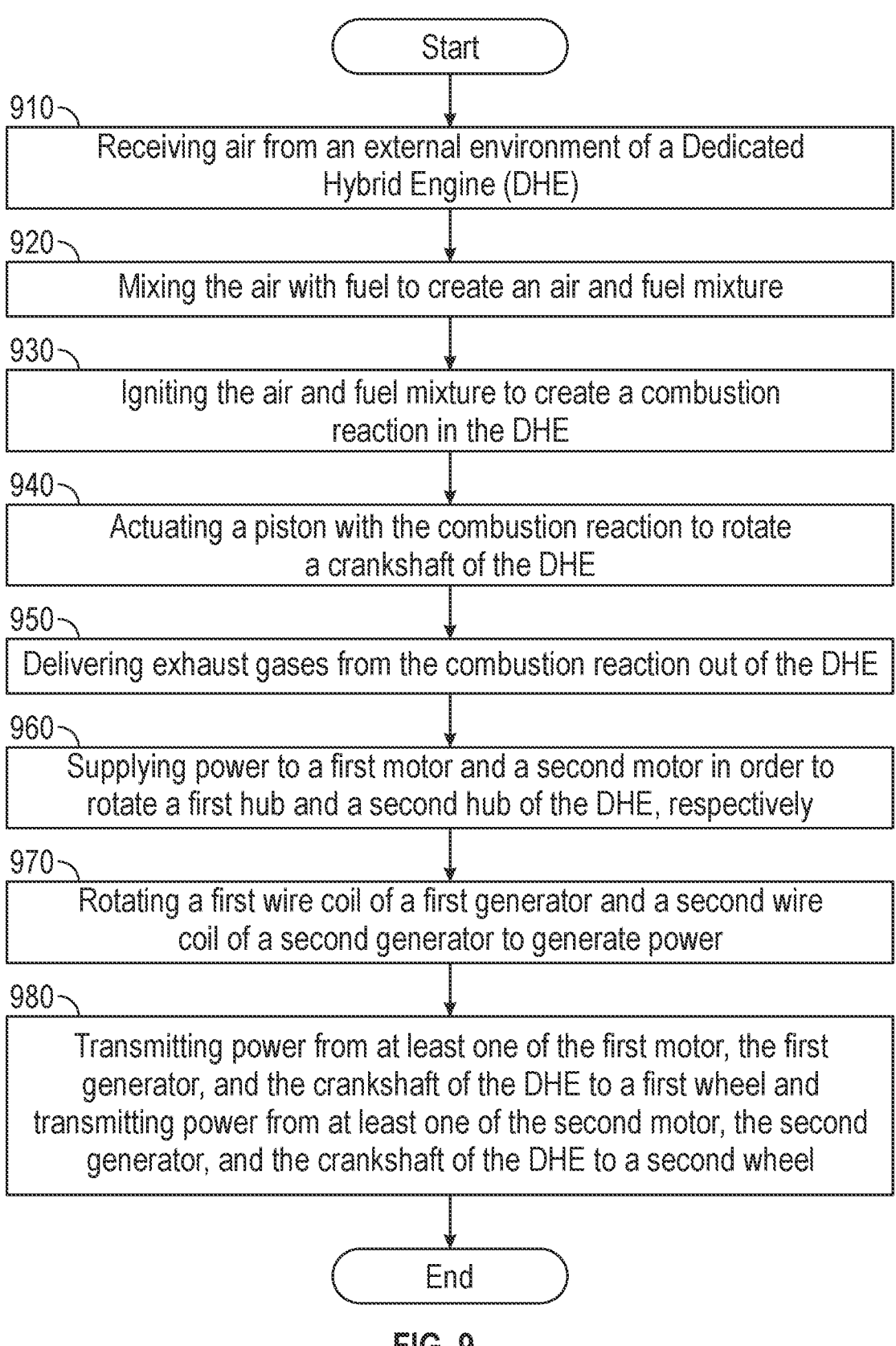

Start

910 — Receiving air from an external environment of a Dedicated Hybrid Engine (DHE)

920 — Mixing the air with fuel to create an air and fuel mixture

930 — Igniting the air and fuel mixture to create a combustion reaction in the DHE 940 — Actuating a piston with the combustion reaction to rotate a crankshaft of the DHE 950 — Delivering exhaust gases from the combustion reaction out of the DHE 960 — Supplying power to a first motor and a second motor in order to rotate a first hub and a second hub of the DHE, respectively 970 — Rotating a first wire coil of a first generator and a second wire coil of a second generator to generate power 980 — Transmitting power from at least one of the first motor, the first generator, and the crankshaft of the DHE to a first wheel and transmitting power from at least one of the second motor, the second generator, and the crankshaft of the DHE to a second wheel End

FIG. 9

INTEGRATED INTERNAL COMBUSTION ELECTRIC MOTOR (ICEM) CONCEPT FOR HYBRID AND PLUG-IN HYBRID VEHICLE APPLICATION

BACKGROUND

Reducing emissions that result from combustion reactions is one of the foremost points of focus for the development of Internal Combustion Engines (ICE). One potential method of reducing emissions involves the use of hybrid ICE systems, which are conventional ICEs coupled to electrical systems that aid in providing power to the vehicle. Examples of such electrical systems include regenerative braking systems and range extension systems, and often include components such as motors, generators, and batteries. However, due to the fact that existing hybrid systems include electrical systems in addition to a conventional ICE, a hybrid vehicle is often more expensive to manufacture than a vehicle that only has a conventional ICE. Furthermore, because the electrical systems are retrofit to existing ICEs, current hybrid vehicles are more inefficient than a hybrid system designed as a cohesive unit.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A hybrid machine includes an engine, a first motor, a second motor, a first generator, a second generator, a first geartrain, and a second geartrain. The engine generates power from a combustion reaction and includes an intake port, a combustion chamber, a piston, and an exhaust port. The intake port receives air from an external environment of the engine. The combustion chamber receives the air from the intake port and mixes the air with fuel to create an air and fuel mixture that is ignited to create the combustion reaction. The piston actuates from the combustion reaction to rotate a crankshaft of the engine. The exhaust port delivers exhaust gases from the combustion reaction out of the engine. The first motor includes a first hub that rotates when power is supplied thereto. The second motor includes a second hub that rotates when power is supplied thereto. The first generator generates power when a first shaft of the first generator is rotated. The second generator generates power when a second shaft of the second generator is rotated. The first geartrain is connected to the first motor, the first generator, and the crankshaft of the engine, and transmits a first amount of power to a first wheel. The second geartrain is connected to the second motor, the second generator, and the crankshaft of the engine, and transmits a second amount of power to a second wheel.

An assembly includes a hybrid machine, a fuel tank, and a battery. The hybrid machine includes an engine, a first motor, a second motor, a first generator, a second generator, a first geartrain, and a second geartrain. The engine generates power from a combustion reaction and includes an intake port, a combustion chamber, a piston, and an exhaust port. The intake port receives air from an external environment of the engine. The combustion chamber receives the air from the intake port and mixes the air with fuel to create an air and fuel mixture that is ignited to create the combustion reaction. The piston actuates from the combustion reaction to rotate a crankshaft of the engine. The exhaust port delivers exhaust gases from the combustion reaction out of the engine. The first motor includes a first hub that rotates when power is supplied thereto. The second motor includes a second hub that rotates when power is supplied thereto. The first generator generates power when a first shaft of the first generator is rotated. The second generator generates power when a second shaft of the second generator is rotated. The first geartrain is connected to the first motor, the first generator, and the crankshaft of the engine, and transmits a first amount of power to a first wheel. The second geartrain is connected to the second motor, the second generator, and the crankshaft of the engine, and transmits a second amount of power to a second wheel. The fuel tank is connected to the hybrid machine and delivers the fuel to the engine. The battery is connected to the hybrid machine and transmits and receives power from the first generator, the second generator, the first motor, and the second motor.

A method for operating a hybrid machine includes receiving air from an external environment of an engine and mixing the air with fuel to create an air and fuel mixture. The air and fuel mixture is ignited to create a combustion reaction in the engine. The combustion reaction actuates a piston, which rotates a crankshaft of the engine. Subsequently, exhaust gases are delivered from the combustion reaction out of the engine. The method further includes supplying power to a first motor to rotate a first hub of the hybrid machine, and supplying power to a second motor to rotate a second hub of the hybrid machine. Additionally, the method includes rotating a first shaft of a first generator to generate power and rotating a second shaft of a second generator to generate power. Finally, the method includes transmitting a first amount of power from at least one of the first motor, the first generator, and the crankshaft of the engine to a first wheel and transmitting a second amount of power from at least one of the second motor, the second generator, and the crankshaft of the engine to a second wheel.

Any combinations of the various embodiments and implementations disclosed herein can be used in a further embodiment, consistent with the disclosure. Other aspects and advantages of the claimed subject matter will be apparent from the following description and the claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIG. 9 depicts a flowchart of a method in accordance with one or more embodiments of the present disclosure.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in an engine as described herein. In this respect, the term "upper" denotes an element disposed vertically above a corresponding "lower" element relative to an engine as a whole, while the term "lower" conversely describes an element disposed vertically below corresponding "upper" element. Likewise, the term "axial" refers to an orientation substantially parallel to an extension direction of an object, while the term "radial" denotes a direction orthogonal to an axial direction.

In general, embodiments of the invention are directed towards a hybrid electrical vehicle (HEV) that includes a Dedicated Hybrid Engine (DHE). The DHE is designed to incorporate components of both an electrical powertrain and a mechanical powertrain. Thus, the DHE includes integrated electric motors and generators that serve to provide and receive additional power to and from an Internal Combustion Engine (ICE) of the vehicle. The DHE further eliminates multiple components typically included in a vehicle only including an ICE (which is referred to an ICE vehicle herein), as the DHE is situated between the front wheels of a vehicle. As such, the DHE eliminates the need for a dedicated transmission and differential, as the functionalities thereof are incorporated into motors and generators of the DHE.

Figure 1:
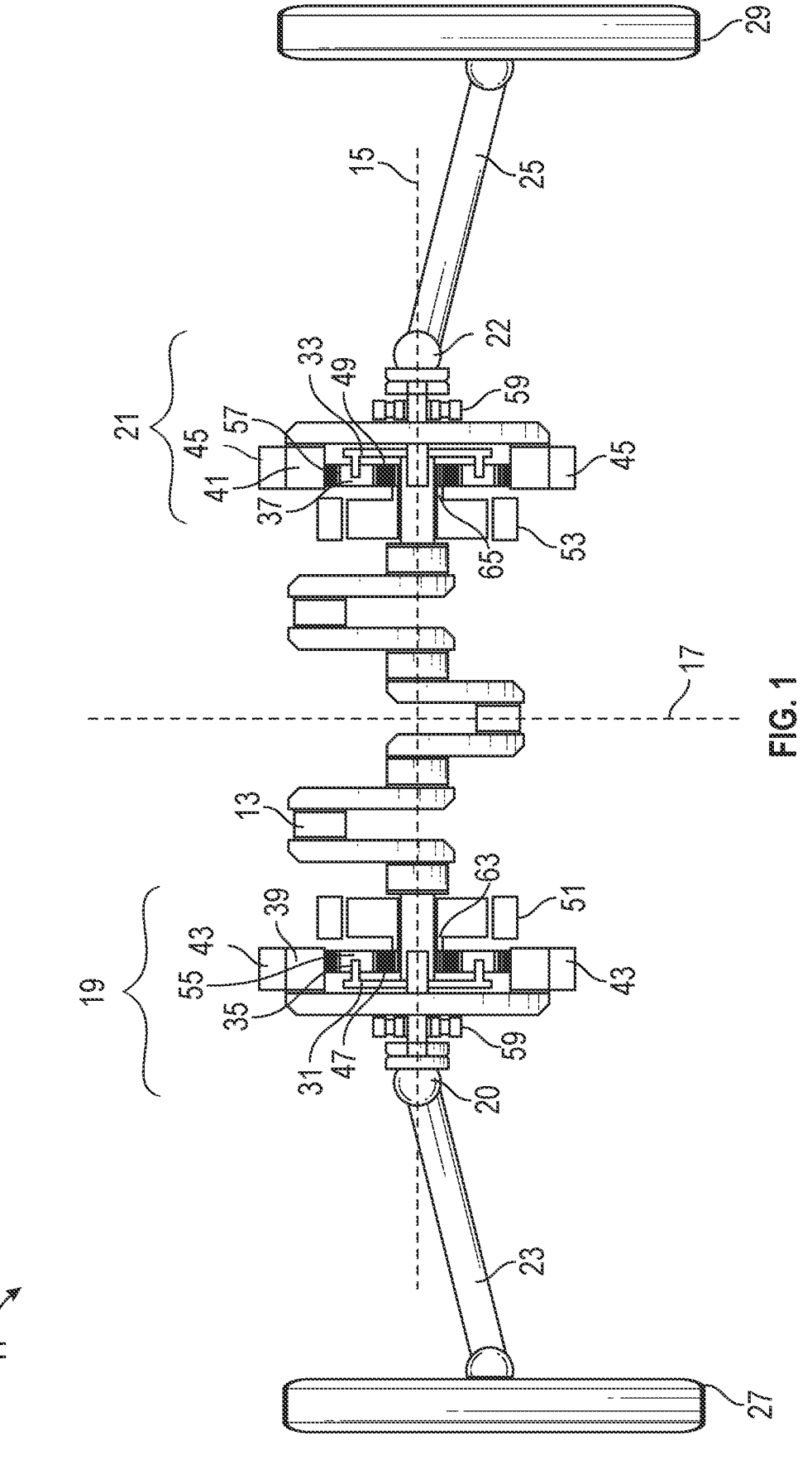
FIG. 1 depicts a front view of a Dedicated Hybrid Engine (DHE), in accordance with one or more embodiments of the present disclosure.

FIG. 1 depicts a DHE 11 in accordance with one or more embodiments disclosed herein. In general, components of FIG. 1 associated with the DHE 11 may be formed of a metal such as iron, aluminum, steel, an alloy, or any equivalent material without departing from the nature of this specification. Each of the components may be formed of the same material, or may be formed of different materials.

As shown in FIG. 1, a DHE 11 includes a crankshaft 13 that primarily extends along a transverse axis 15 between a first epicyclic geartrain 19 and a second epicyclic geartrain 21. The first epicyclic geartrain 19 connects to a first half shaft 23 connected to a first wheel 27 and a second half shaft 25 connected to a second wheel 29. The connection between the first epicyclic geartrain 19 and the first wheel 27 is a rotating jointed connection, such as a ball joint, a CV joint, or equivalent, which is depicted as the first jointed connection 20 in FIG. 1. Similarly, the second half shaft 25 is connected to the second wheel 29 with a second jointed connection 22.

Although not depicted in FIG. 1, the crankshaft 13 is actuated by way of a piston (e.g., FIG. 3) that actuates from forces generated by an internal combustion reaction. The motion of the crankshaft 13 is transferred to the first wheel 27 and the second wheel 29 via the first epicyclic geartrain 19 and the second epicyclic geartrain 21, which are planetary gearsets. Specifically, a first planet gear 35 and a second planet gear 37 rotate from the motion of the crankshaft 13, the first carrier 31, and the second carrier 33. This causes a first hub 39 and a second hub 41 respectively connected to the first wheel 27 and the second wheel 29, to rotate from the motion of the crankshaft 13. Overall, the DHE 11 is symmetrical about a radial axis 17 that extends orthogonal to the transverse axis 15 such that the first epicyclic geartrain 19 and its constituent components (including a first portion of the crankshaft 13) are substantially symmetrical to the orientation of the second epicyclic geartrain 21 and its constituent components (including a second portion of the crankshaft 13), which simplifies the design of the DHE 11.

Continuing with FIG. 1, the first carrier 31 and the second carrier 33 are respectively attached to a first planet gear 35 and a second planet gear 37, which connect to a first ring gear 55 fixed to a first hub 39 and a second ring gear 57 that is fixed to a second hub 41, respectively. The first hub 39 is surrounded by a first motor coil 43, while the second hub 41 is surrounded by a second motor coil 45. Thus, as depicted in FIG. 1, the first epicyclic geartrain 19 and the second epicyclic geartrain 21 are formed with a first motor coil 43 and a second motor coil 45 extending around the periphery thereof such that the first motor coil 43 and the second motor coil 45 form the exterior of the first epicyclic geartrain 19 and the second epicyclic geartrain 21, respectively. Finally, the first hub 39 and the second hub 41 are supported by a first bearing 59 and a second bearing 61, which serve to stabilize the DHE 11 in relation to the first half shaft 23 and the second half shaft 25.

As is commonly known in the art, a motor is generally formed of a magnetized shaft that is surrounded by a coil of wire. When electricity flows through the coil of wire an electromagnetic field is generated, causing the magnetized shaft to rotate, or vice versa. In the case of FIG. 1, the first motor coil 43 and the second motor coil 45 are energized coils of wire, while the first hub 39 and the second hub 41 are magnetized and rotate when the electrical field is generated. Thus, the first hub 39 and the second hub 41 form a first motor, while the second hub 41 and second motor coil 45 form a second motor. When electricity flows through the first motor coil 43 and the second motor coil 45, the first hub 39 and the second hub 41 rotate, causing the first ring gear 55 and the second ring gear 57 to rotate as well.

The remainder of the first epicyclic geartrain 19 is formed by a first sun gear 47 that connects to a first sun gear shaft 63, and a first ring gear 55 that connects to the first hub 39. The second epicyclic geartrain 21 is similarly formed of a second sun gear 49 that connects to a second sun gear shaft 65, and a second ring gear 57 that connects to the second hub 41. The first sun gear shaft 63 and the second sun gear shaft 65 are respectively surrounded by a first generator coil 51 and a first ring gear 55. As is also commonly known in the art, a generator includes components substantially similar to a motor, and is formed of a coil of wires that surrounds a magnetized material, or vice versa, where the rotation of the magnetized material generates electricity in the coil of wires. Accordingly, the first generator coil 51 and the second generator coil 53 are coils of wire that serve to transform excess motion from the first sun gear shaft 63 and the second sun gear shaft 65, respectively, into electrical energy that may be stored in a battery of a vehicle (e.g., FIG. 8). Due to the similar design of a generator and a motor, the first generator coil 51 and the second generator coil 53 may be operated as motors by providing electricity thereto. Similarly, the first motor coil 43 and the second motor coil 45 may be operated as generators by rotating the first hub 39 and the second hub 41, which generates electricity that is used to subsequently power the vehicle.

The DHE 11 may be operated in numerous ways depending upon the operation of the first motor coil 43 and the second motor coil 45, the crankshaft 13, and the first generator coil 51 and the second generator coil 53. The DHE 11 receives operating instructions from and is controlled by an Electronic Control Unit (ECU), which is described in conjunction with FIG. 8. As a first mode of operation, the crankshaft 13 is rotated, and power is provided to the first motor coil 43 and the second motor coil 45, causing the first hub 39 and the second hub 41 to rotate as well. The crankshaft 13 generates the primary level of power in the first wheel 27 and second wheel 29, which is supplemented by power from the first motor coil 43 and the second motor coil 45. In this case, the first carrier 31 and second carrier 33, the first hub 39 and the second hub 41, and the first planet gear 35 and the second planet gear 37 will all rotate in the same direction. The boosted power level is transmitted to the first wheel 27 and the second wheel 29 via the first hub 39 and the second hub 41, where the first wheel 27 and the second wheel 29 rotate at the same speed as the first hub 39 and the second hub 41.

Due to the aforementioned components rotating in the same direction, the first sun gear 47 and the second sun gear 49 react to the rotation of the first hub 39 and the second hub 41. In particular, because the first motor coil 43 and the second motor coil 45 provide supplemental power in addition to the primary power provided by the crankshaft 13, the first hub 39 and the second hub 41 will rotate faster than the first carrier 31 and the second carrier 33. The first planet gear 35 and the second planet gear 37 compensate for this rotational imbalance by rotating the first sun gear 47 and the second sun gear 49, respectively. Because the first sun gear 47 and the second sun gear 49 rotate within the first generator coil 51 and the second generator coil 53, energy from the rotational imbalance is captured and returned to the battery of the vehicle (e.g., FIG. 8).

As a second mode of operation, the DHE 11 may be operated purely based upon the power of the first motor coil 43 and the second motor coil 45. In this case, a combustion reaction does not occur and the crankshaft 13 remains stationary. This, in turn, keeps the first carrier 31 and the second carrier 33 fixed in place. When power is provided to the first motor coil 43 and the second motor coil 45, the first hub 39 and second hub 41 rotate, which rotates the first planet gear 35 and the second planet gear 37 as well as the first half shaft 23 and the second half shaft 25. The rotation of the first half shaft 23 and second half shaft 25 drives the first wheel 27 and the second wheel 29. On the other hand, the rotation of the first planet gear 35 is transmitted directly to the first sun gear 47 and the first sun gear shaft 63, which generates electricity by the first generator coil 51. Similarly, the rotation of the second planet gear 37 is transmitted directly to the second sun gear 49 and the second sun gear shaft 65, which generates electricity by the second generator coil 53. Thus, the second mode of operation is one where the vehicle is only powered with electricity, which is beneficial for reducing emissions as exhaust gases are not generated from the combustion reaction.

In a third mode of operation, power is supplied to the crankshaft 13, the first motor coil 43, the second motor coil 45, the first generator coil 51, and the second generator coil 53. In this case, the power received by the first motor coil 43, the second motor coil 45, the first generator coil 51, and the second generator coil 53 allows the first hub 39, the second hub 41, the first sun gear shaft 63 and the second sun gear shaft 65 to rotate at the same speed as the crankshaft 13. The third mode is useful, for example, as a high torque mode, as each of the components of the DHE 11 are rotated in the same direction and speed, and there is no excess energy captured by the DHE 11.

In each of the operating modes described above, it is assumed that an equal amount of power is provided to the first motor coil 43 and the second motor coil 45. and cases of unequal power distribution are further discussed below. Specifically, FIG. 1 depicts that the DHE 11 is directly connected to the first wheel 27 and the second wheel 29, and does not include a transmission or a differential. Typically, the transmission adjusts the ratio of speed and torque output by a crankshaft of an engine to suit the driving environment of a vehicle. On the other hand, a differential is used to ensure that a vehicle may turn without damaging its wheels, as one side of the vehicle will travel a further distance than the other side during a turning maneuver.

In the case of FIG. 1, the first motor coil 43, the second motor coil 45, the first generator coil 51, and the second generator coil 53 replace these functions. Specifically, while the vehicle is turning, the first motor coil 43 will receive more power than the second motor coil 45, or vice versa. The excess power causes the first half shaft 23 to rotate faster than the second half shaft 25 (or vice versa), which causes the vehicle as a whole to turn. Alternatively, the vehicle may turn by capturing excess power with the first generator coil 51 or the second generator coil 53, rather than generating power in the first motor coil 43 or second motor coil 45. Furthermore, either of the first motor coil 43 or the second motor coil 45 may be energized while the opposing second generator coil 53 or first generator coil 51 respectively generates power.

The method of turning the first wheel 27 and the second wheel 29 depends upon the speed of the vehicle while turning, the radius of the turn, and the overall power level of the vehicle. For example, if the battery is fully charged and the vehicle is turning at a relatively low speed, the first half shaft 23 and the second half shaft 25 may receive turning power from the first motor coil 43 and the second motor coil 45 to ensure that the turn is completed. On the other hand, if the battery of the vehicle has a low charge level, and the vehicle is traveling at a high rate of speed, the first generator coil 51 and the second generator coil 53 are used to turn the vehicle in order to generate electricity that charges the battery. As noted above, the DHE 11 is controlled with an ECU (e.g., FIG. 8), which determines the mode of operating the DHE 11 as well as controlling the amount of power transmitted to the first motor coil 43 and the second motor coil 45.

Figure 2:
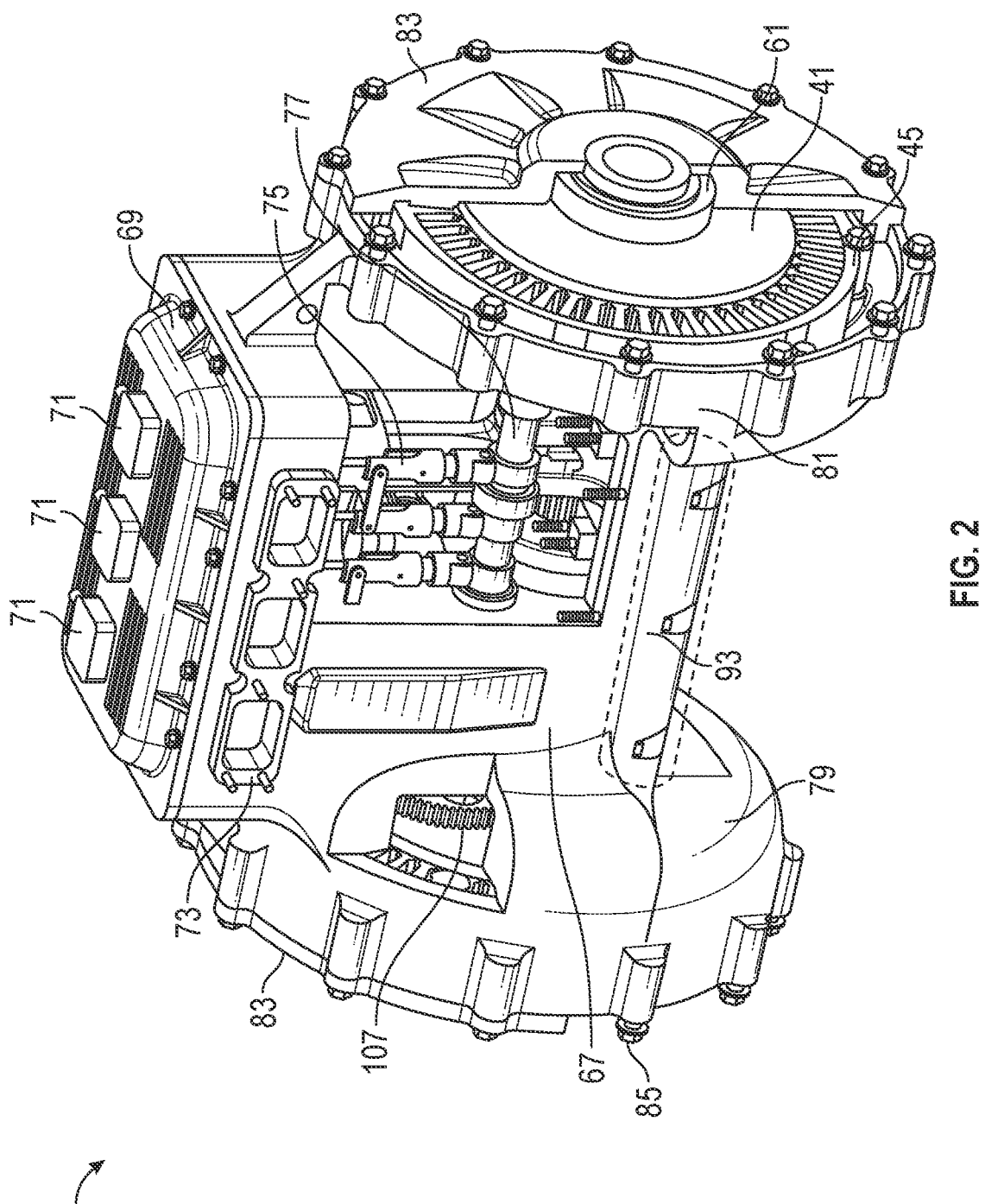
FIG. 2 depicts an isometric view of a DHE in accordance with one or more embodiments of the present disclosure.

FIG. 2 depicts an isometric view of a DHE 11 consistent with one or more embodiments of the invention described herein. As shown in FIG. 2, components of the DHE 11 are encased in an engine block 67, which may be formed of steel, iron, an alloy, or equivalent material known to a person of ordinary skill in the art. The engine block 67 is formed from a single block of material through a casting or machining process, which advantageously simplifies the overall design of the DHE 11.

Components of the DHE 11 that facilitate the combustion reaction are inserted through the uppermost portion of the engine block 67, which is covered by a valve cover 69 in FIG. 2, and the lowermost portion of the engine block 67, which is covered by a crankshaft carrier 93. The crankshaft carrier 93 is discussed in relation to FIG. 3, and is not discussed in relation to FIG. 2 for the sake of brevity.

The valve cover 69 includes multiple spark plug assemblies 71, where each spark plug assembly 71 is associated with a separate combustion chamber (e.g., FIG. 4) of the DHE 11. The spark plug assemblies 71 serve to generate sparks that actuate pistons (e.g., FIG. 3) in the combustion chambers (e.g., FIG. 4). Air for the combustion reaction is received in the combustion chambers (e.g., FIG. 4) by way of a series of intake ports 73, which are orifices that extend from an external environment to the combustion chamber (e.g., FIG. 4). Fuel for the combustion reaction may be received in the combustion chambers through the spark plug assemblies 71 as a direct injection arrangement, or alternatively through the intake ports 73. Thus, the spark plug assembly 71 includes components such as a spark plug, a fuel injector, connecting wires, and associated components that initiate a combustion reaction in the combustion chambers (e.g., FIG. 4).

The flow of fluid through the intake ports 73 is controlled by a plurality of pushrods 75, which extend vertically through the DHE 11. In particular, the pushrods 75 actuate intake valves (not shown) internal to the DHE 11 that selectively cover the intake ports 73 to allow fluid communication with the combustion chambers (e.g., FIG. 4). The pushrods 75 are actuated by a camshaft 77 that extends in the transverse direction through the DHE 11, and the camshaft 77 is geared to the crankshaft 13 with a camshaft timing gear 107 such that the camshaft 77 rotates therewith. On the other hand, burnt combustion gases generated from the combustion reaction are expelled from the DHE 11 via a series of exhaust ports (e.g., FIG. 4) that are located opposite the intake ports 73 and also have a fluid flow controlled by pushrods 75. The inclusion of pushrods 75 aids in simplifying the design of the DHE 11, as the pushrods 75 have a compact design that does not require the camshaft 77 to be positioned above the combustion chamber (e.g., FIG. 4).

Continuing with FIG. 2, each transverse end of the engine block 67 houses components of the first epicyclic geartrain 19 and the second epicyclic geartrain 21. Thus, as shown in FIG. 2, the engine block 67 includes a first geartrain compartment 79 that houses the first epicyclic geartrain 19. On the other hand, a second geartrain compartment 81 houses the second epicyclic geartrain 21 which is depicted as including the second motor coil 45 and the second hub 41. As shown in FIG. 2, the first geartrain compartment 79 and the second geartrain compartment 81 are formed as substantially cylindrical portions of the engine block 67. Each geartrain compartment is covered by a cover 83 such that only the first hub 39 (e.g., FIG. 1) and the second hub 41 extend out of the cover 83 in order to rotate the first half shaft 23 and the second half shaft 25. The cover 83 is formed as a circular sheet of metal or an equivalent rigid material, and is fixed to the engine block 67 with bolts 85. The structure and design of the bolts 85 is routine in the art, and is not discussed herein for the sake of brevity.

Thus, overall, components forming the DHE 11 are assembled with the engine block 67 forming the primary structure for assembly components with each other. Because the engine block 67 is formed of a unitary block of material and does not require disassembly, components of the DHE 11 may be quickly accessed by unbolting the component (or its assembly) from the engine block 67. Such is in stark contrast to a modern combustion engine, which is typically formed of multiple engine blocks that are fixed to each other. That is, a DHE 11 having an engine block 67 is advantageous, for example, because it is not necessary (or feasible) to disassemble the engine block 67 to access pistons (e.g., FIG. 3).

Figure 3:
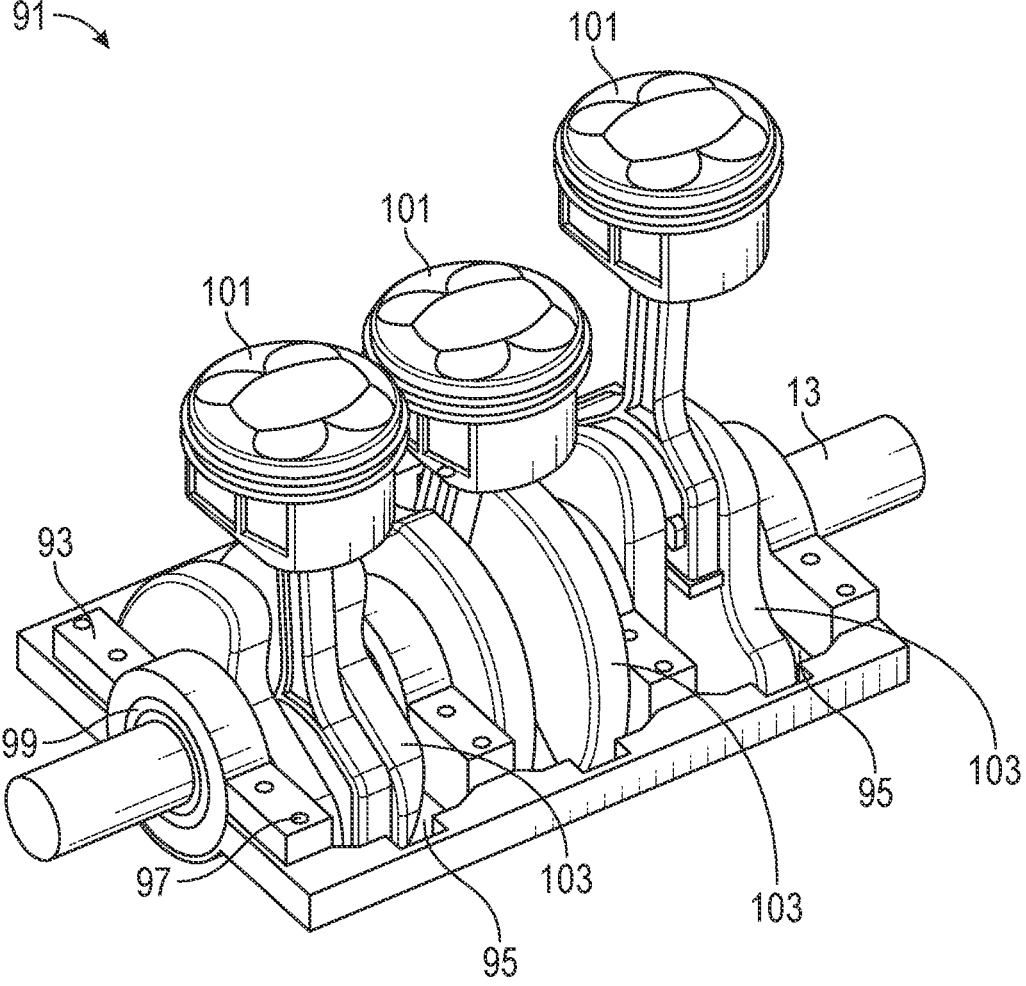
FIG. 3 depicts a piston and crankshaft assembly in accordance with one or more embodiments of the present disclosure.

FIG. 3 depicts a piston assembly 91 according to one or more embodiments described herein. As shown in FIG. 3, the piston assembly 91 is formed of a crankshaft carrier 93 that includes a series of orifices 95, bolt holes 97, and a crankshaft opening 99. The crankshaft carrier 93 is a planar surface that primarily extends in a transverse direction relative to the DHE 11, and may be formed of metals such as iron, aluminum, steel, or equivalent materials described herein or known to a person having ordinary skill in the art. The bolt holes 97 allow the crankshaft carrier 93 to be bolted to the engine block 67, which cases the assembly of the DHE 11 and allows the piston assembly 91 to quickly be removed for repairs.

The orifices 95 of the crankshaft carrier 93 primarily extend in a radial direction orthogonal to the extension direction of the crankshaft carrier 93. On the other hand, the crankshaft 13 extends in a transverse direction through the crankshaft carrier 93 such that the crankshaft 13 extends through the orifices 95. The orifices 95 receive pistons 101 that rotate the crankshaft 13 and counterweights 103 that balance the rotational energy generated by the pistons 101 during a combustion reaction. As such, the orifices 95 have a width equal to the width of a counterweight 103. Thus, to assemble the piston assembly 91, the pistons 101 and the counterweights 103 are inserted into the crankshaft carrier 93, and the crankshaft 13 is inserted through the crankshaft opening 99, the pistons 101, and the counterweights 103. This arrangement allows the piston assembly 91 to be disassembled with ease, as each component is able to be separated from the piston assembly 91 once the crankshaft 13 is removed from the crankshaft opening 99. The crankshaft opening 99 has an interior diameter that matches the outer diameter of the crankshaft 13 and may include bearings that allow the crankshaft 13 to freely rotate within the crankshaft opening 99.

Figure 4:
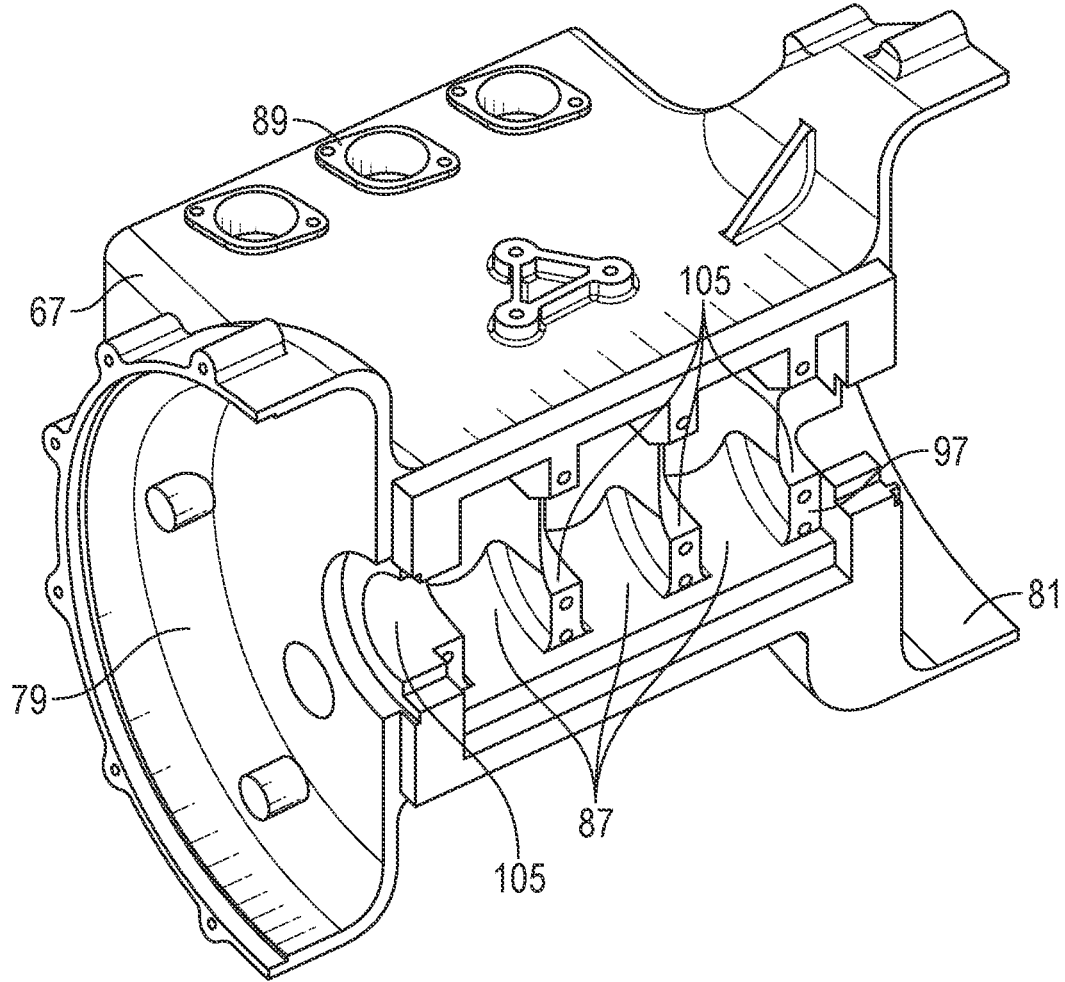
FIG. 4 depicts an engine block in accordance with one or more embodiments of the present disclosure.

Turning to FIG. 4, FIG. 4 depicts a separate isometric view of an engine block 67 according to one or more embodiments described herein. As shown in FIG. 4, and as noted above, the engine block 67 is formed as a single, integrated component by way of a casting process, machining process, additive manufacturing process, or equivalent procedure. The engine block 67 may be formed, for example, of materials such as steel, iron, aluminum, an alloy, derivatives of the aforementioned materials, or equivalent materials known to a person having ordinary skill in the art.

The engine block 67 includes a series of compartments that serve to at least partially house components of the DHE 11. The compartments include, for example, a series of combustion chambers 87 that each house a piston 101 and a combustion reaction. Burnt exhaust gases are expelled through a series of exhaust ports 89, which are orifices that connect the combustion chambers 87 to an external environment of the DHE 11. Although not shown, the exhaust ports 89 include exhaust valves actuated by the pushrods 75 to expel the burnt gases from the DHE 11, where the structure of the exhaust valves in relation to the exhaust ports 89 is routine in the art. Furthermore, and although not depicted in FIG. 4, the exhaust ports 89 may be connected to a catalytic converter via an exhaust gas manifold and tailpipe to further reduce emissions from the DHE 11.

The engine block 67 further includes a first geartrain compartment 79 and a second geartrain compartment 81. The first geartrain compartment 79 and the second geartrain compartment 81 are cylindrical or semi-cylindrical orifices that primarily extend in a transverse direction away from the combustion chambers 87. The first geartrain compartment 79 is sized to accommodate the first epicyclic geartrain 19, particularly the first motor coil 43 and the first hub 39. The second geartrain compartment 81 is similarly sized, and has dimensions equivalent to the first geartrain compartment 79.

In order to accommodate the piston assembly 91 depicted in FIG. 3, the engine block 67 has a series of semicircular grooves 105 that are aligned in the transverse direction. The piston assembly 91 is assembled with the engine block 67 by inserting the pistons 101 into the combustion chambers 87, at which point the crankshaft 13 abuts against the grooves 105. To complete the assembly process, bolts 85 are inserted into the bolt holes 97 of the piston assembly 91 and the bolt holes 97 of the engine block 67, which rigidly fixes the piston assembly 91 to the engine block 67. The number of bolt holes 97 depends upon the operating conditions of the DHE 11 or the desired robustness thereof, and may vary accordingly.

Once the piston assembly 91 is assembled with the engine block 67, the DHE 11 is formed by inserting the first epicyclic geartrain 19 and the second epicyclic geartrain 21 into the first geartrain compartment 79 and the second geartrain compartment 81, respectively. After the first epicyclic geartrain 19 and second epicyclic geartrain 21 have been inserted into the engine block 67, the covers 83 are attached to the engine block 67. Subsequently, the first half shaft 23 and the second half shaft 25 are respectively connected to the first epicyclic geartrain 19 and the second epicyclic geartrain 21 to integrate the DHE 11 with a vehicle (e.g., FIG. 8).

Figure 5:
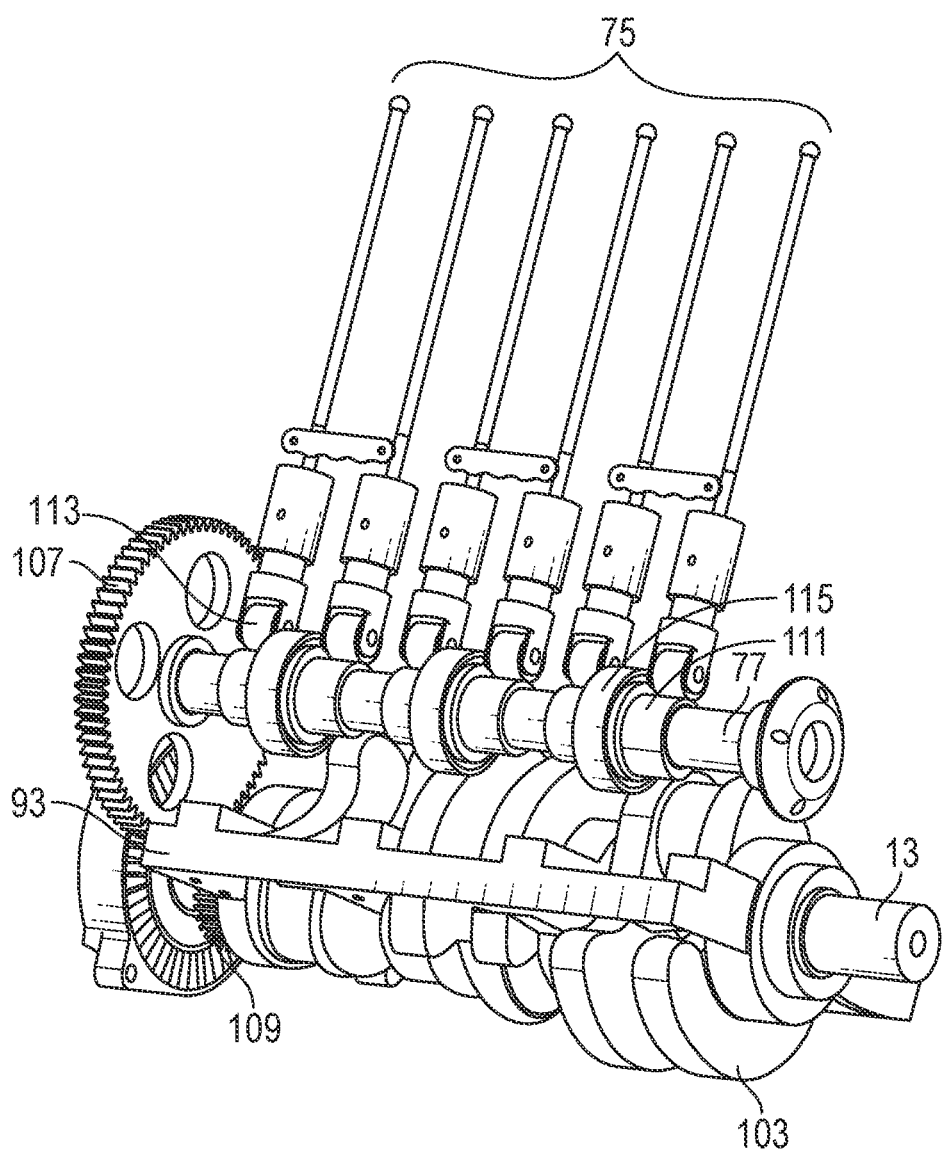
FIG. 5 depicts a camshaft assembly and a crankshaft assembly in accordance with one or more embodiments of the present disclosure.

FIG. 5 depicts an assembly formed by the piston assembly 91, the camshaft 77, and the pushrods 75. As noted above, the pushrods 75 and the camshaft 77 control fluid communication through the intake ports 73 and the exhaust ports 89 of the DHE 11 by actuating at specific times to create conditions suitable for the combustion reaction. To ensure the pushrods actuate at the specific times, the rotation of the camshaft 77 is timed to that of the crankshaft 13 by way of a camshaft timing gear 107 and a crankshaft timing gear 109. The camshaft timing gear 107 is rigidly fixed, by way of a welding or brazing process, a set screw or bolted connection, or equivalent procedure, to the camshaft 77. The crankshaft timing gear 109 is similarly fixed to the crankshaft 13. Thus, as the crankshaft 13 is rotated (due to the motion of the pistons 101), the crankshaft timing gear 109 rotates, and meshes with the camshaft timing gear 107. This, in turn, causes the camshaft 77 to rotate from the motion of the camshaft timing gear 107.

To actuate the pushrods 75, the camshaft 77 includes camshaft lobes 111 that are rigidly fixed to the camshaft 77. The camshaft lobes 111 are spaced apart by needle bearings 115, which abut against and rotate with counterweights 103 attached to the crankshaft 13. A tappet 113, which is a bearing or similar rotating element that acts as a cam follower for the camshaft lobes 111, is fixed to the end of each of the pushrods 75. Each pushrod 75 and its corresponding tappet 113 is associated with and abuts against a single camshaft lobe 111 such that the pushrods 75 are actuated by the rotation of the camshaft 77. Thus, the pushrods 75 are mechanically actuated in time with the rotation of the crankshaft 13.

The use of the pushrods 75 provides multiple benefits for the DHE 11. In particular, the use of the pushrods 75 avoids the need for a dedicated timing belt or timing chain, which may slip if the belt, chain, or associated components are worn. Furthermore, due to the fact that the crankshaft carrier 93 is fixed to the engine block 67, the components of FIG. 5 are primarily enclosed within and protected by the engine block 67, and the actuation of the pushrods 75 is not affected by debris or external engine conditions. Finally, the pushrods 75 offer a compact design in comparison to an overhead camshaft design, as the engine block 67 can house the camshaft 77 and the crankshaft 13 in the same compartment. In an alternate embodiment (not shown), the DHE 11 may be formed as having an overhead camshaft design without pushrods 77, where the overhead camshaft may be actuated by a chain connected to the crankshaft timing gear 109.

Figures 6A, 6B, 6C:
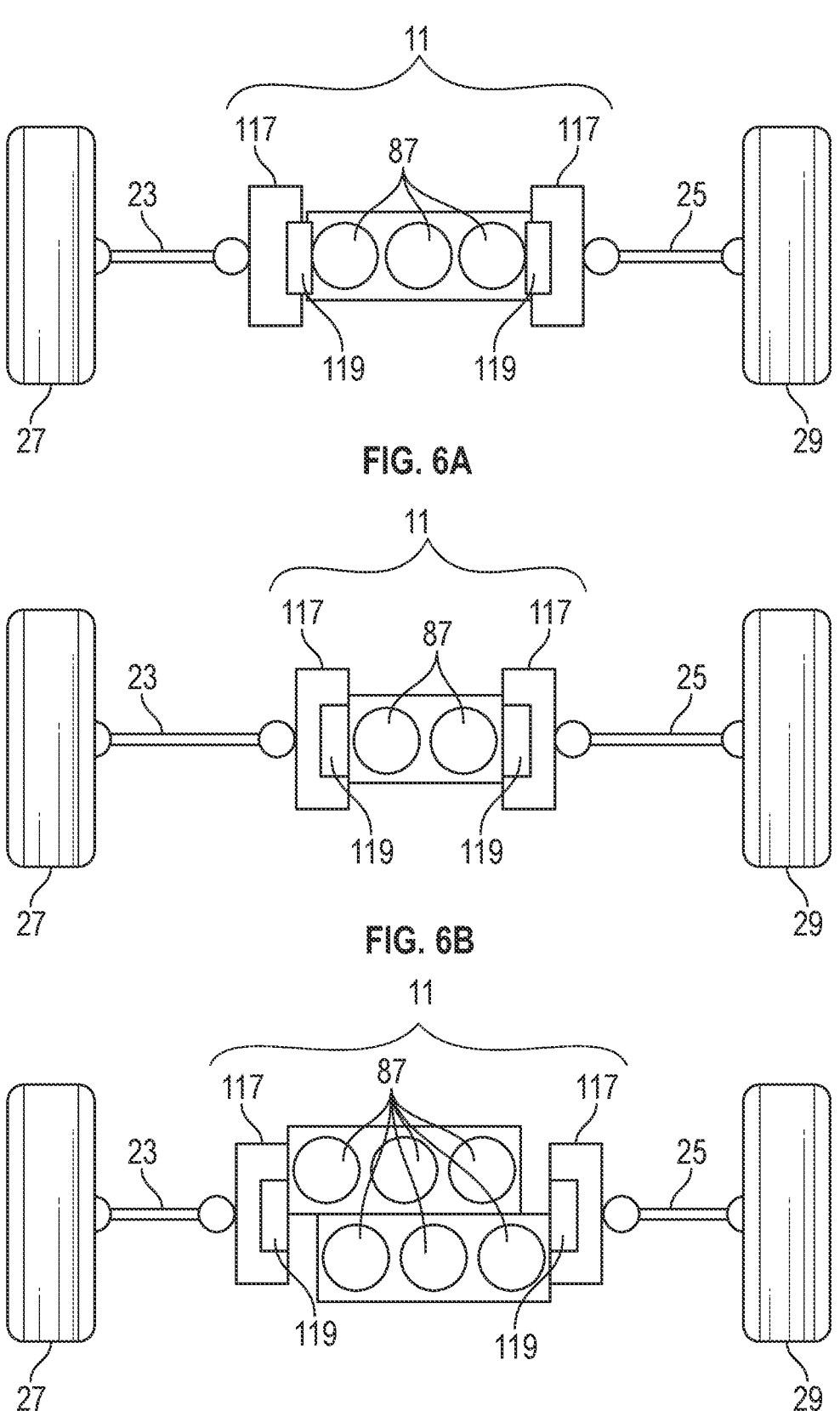
FIGS. 6A, 6B, and 6C depict DHEs in accordance with one or more embodiments of the present disclosure.

FIGS. 6A-6C illustrate arrangements of a DHE 11 in accordance with one or more embodiments disclosed herein. In particular, FIG. 6A depicts a DHE 11 as including a series of three combustion chambers 87 that house a combustion reaction as described above. The combustion chambers 87 are disposed in a row (or "inline") extending in the transverse direction, and are sandwiched between two motors 117 and two generators 119 of the DHE 11. The transverse direction is a direction orthogonal to the primary direction of motion of the vehicle, such that the DHE 11 will move through a motion path of the first wheel 27 and the second wheel 29 at an angle that is 90 degrees from its primary direction of extension. Consistent with FIG. 1, the motor 117 of FIG. 6A is formed by a motor coil 43 and a hub 39, while the generator 119 is formed by a generator coil 51 and a sun gear shaft 63, as described above. As depicted in FIG. 6A, due to the small number of combustion chambers 87, the combustion chambers 87, the motors 117, and the generators 119 are disposed sharing a common axis with the first half shaft 23, the second half shaft 25, the first wheel 27, and the second wheel 29.

FIG. 6B depicts an embodiment of a DHE 11 similar to that of FIG. 6A, with the exception that the number of combustion chambers 87 is two. As shown in FIG. 6B, the DHE 11 still retains an inline design in this configuration, where the combustion chambers 87 are disposed along a transverse axis (e.g., FIG. 1) common to the first half shaft 23, the second half shaft 25, the first wheel 27, and the second wheel 29. On the other hand, FIG. 6C depicts that a DHE 11 having six combustion chambers 87 is oriented in a staggered "V" formation such that the combustion chambers 87 extend in two adjacent rows with three combustion chambers 87 per row. In this configuration, the two rows of combustion chambers 87 are still bounded on either side by the two motors 117 and the two generators 119. Thus, regardless of the configuration of the DHE 11, the DHE 11 as a whole is disposed in line with the first half shaft 23, the second half shaft 25, the first wheel 27, and the second wheel 29.

The number of combustion chambers 87 depends upon the anticipated load of the vehicle. As is commonly known in the art, the number of combustion chambers corresponds to both the power of the engine and the amount of emissions generated by the engine. Accordingly, a light duty vehicle such as a compact car benefits from a two combustion chamber 87 design as depicted in FIG. 6B, which has relatively low emissions, a low weight, and a high efficiency. On the other hand, a six combustion chamber 87 design, such as the one depicted in FIG. 6C, offers a high power output at the cost of high emissions and a high overall weight. A three cylinder design as depicted in FIG. 6A balances the power output, weight, efficiency, and emissions of the DHE 11. Thus, the number of combustion chambers 87 utilized in a vehicle depends upon the contemplated use case of the vehicle.

Figure 7A:
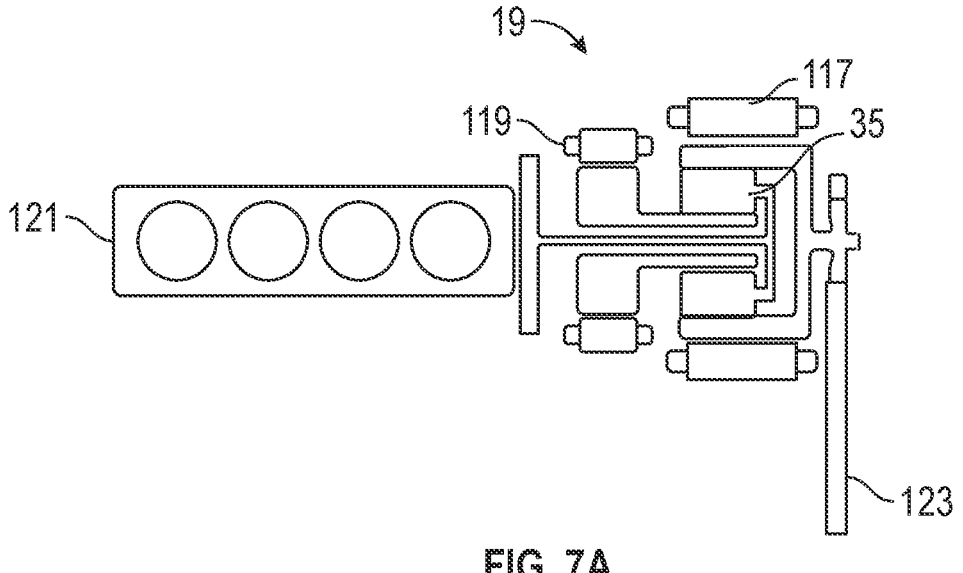
FIGS. 7A and 7B depict an epicyclic geartrain in accordance with one or more embodiments of the present disclosure.
Figure 7B:
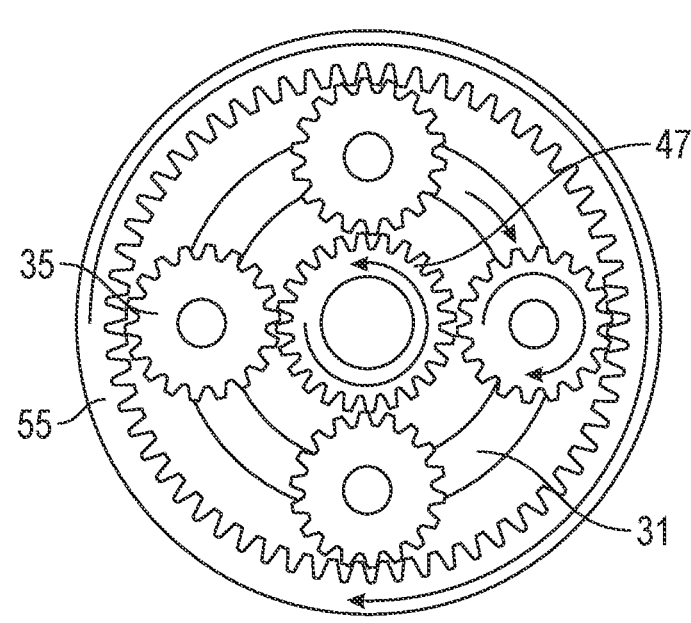

FIGS. 7A and 7B depict different views of an epicyclic geartrain 19 as described herein. Although the components of FIG. 7A are numbered the same as components of the first epicyclic geartrain 19 of FIG. 1, the below description is equally applicable to a second epicyclic geartrain 21. As depicted in FIG. 7A, an Internal Combustion Engine (ICE) 121, which is formed of components described above such as the engine block 67, the crankshaft 13, and the piston assembly 91, is fixed to a carrier 31. The carrier 31 is an annular disc formed of metal or an equivalent material, and supports a series of planet gears 35 as shown in FIG. 7B. Specifically, as shown in FIG. 7B, the planet gears 35 are fixed with a pivoting connection, such as a pivot pin or bearing, to the carrier 31. Thus, when the carrier 31 rotates from the motion of the crankshaft 13, the planet gears 35 rotate around the interior of the epicyclic geartrain 19 to mesh with both a sun gear 47 and a ring gear 55.

Returning to FIG. 7A, the sun gear 47 is part of a generator 119, which is formed with a sun gear shaft 63 that rotates to generate power with a generator coil 51 as described above. On the other hand, the ring gear 55 forms a hub 39 that rotates within a motor coil 43 to form a motor 117. To further control the output of the DHE 11 as a whole, the motor 117 may be connected to a reduction gear unit 123, which is one or more gears that serve to convert the torque output by the DHE 11 into additional speed, or vice versa.

In conjunction with both FIG. 7A and FIG. 7B, either of the sun gear 47 or the ring gear 55 may be the gear reacting to the motion of the carrier 31 and/or planet gear 35. To this end and as described above, if power is supplied to the motor 117 while the ICE 121 is actuating, both the ring gear 55 and the carrier 31 will rotate. This causes the sun gear 47 to rotate in reaction to the motion of the ring gear 55 and the carrier 31, which generates power within the generator 119 as described above. Such an arrangement is useful when the output of the ICE 121 must be combined with power from the motor 117 to generate additional power at the wheel 27. Similarly, the ring gear 55 may rotate under power from the motor 117 while the ICE 121 does not actuate, in which case the sun gear 47 reacts to the motion of the ring gear 55. This case corresponds to using the DHE 11 in a purely electrical mode, as a combustion reaction does not occur in the ICE 121. Furthermore, the DHE 11 may be operated purely under power from the ICE 121, in which case the sun gear 47 remains stationary and the ring gear 55 rotates without power from the motor 117. In this case, a small amount of current may be applied to the generator 119 to aid in the sun gear 47 resisting motion from the carrier 31 and the planet fears 35. Finally, the ring gear 55, the carrier 31, and the sun gear 47 may all be rotated in tandem, which corresponds to a direct operating mode useful in conditions that require high torque output by the DHE 11.

Figure 8:
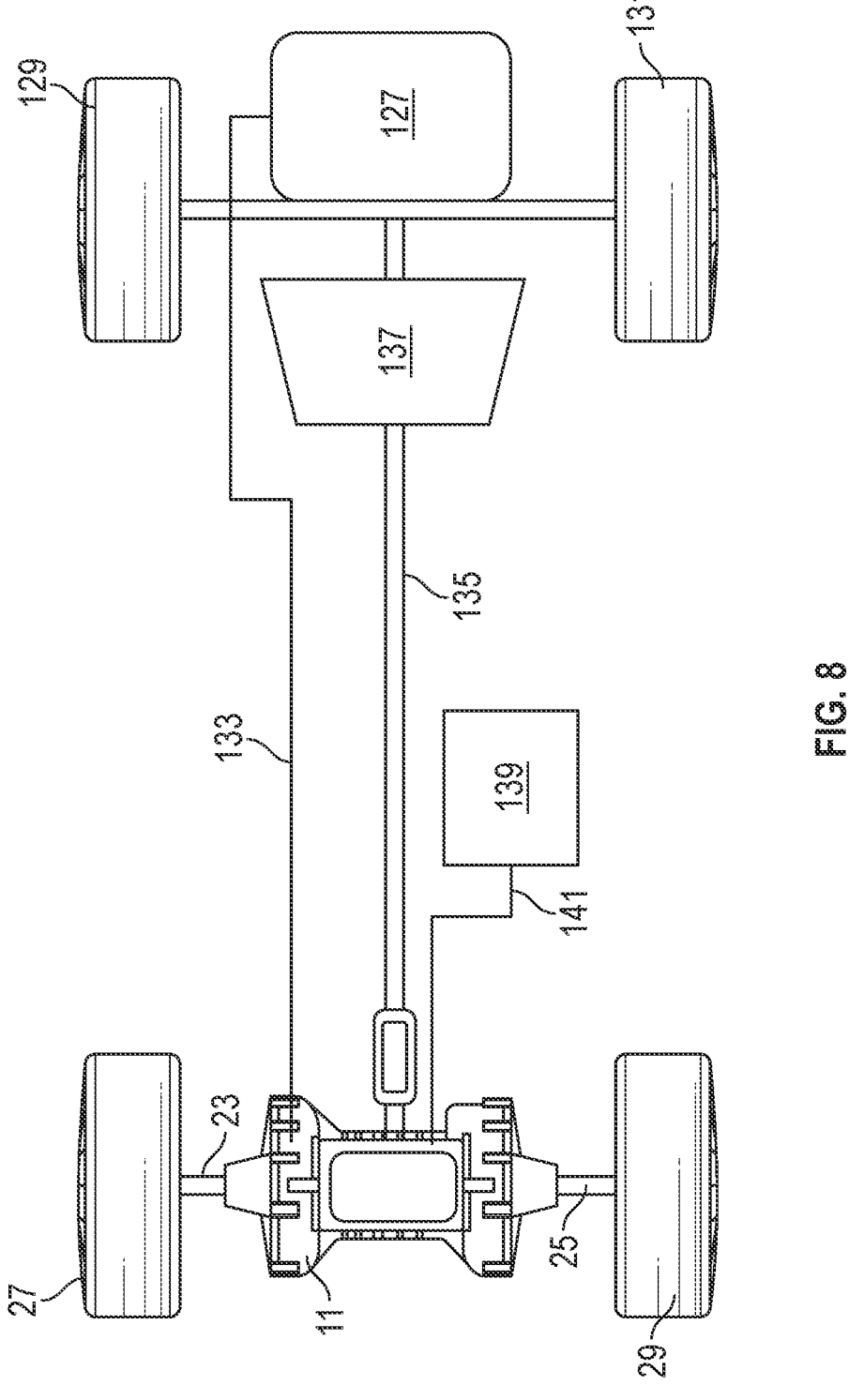
FIG. 8 depicts a vehicle in accordance with one or more embodiments of the present disclosure.

FIG. 8 depicts an embodiment of a vehicle 125 including a DHE 11 according to one or more embodiments disclosed herein. As shown in FIG. 8, the DHE 11 is centered between the first wheel 27 and the second wheel 29 such that the DHE 11 is disposed at the front of the vehicle 125. To rotate the first wheel 27 and the second wheel 29, the DHE 11 receives power, via a power line 133, from a battery 127 disposed between a third wheel 129 and a fourth wheel 131 located at the rear of the vehicle. The power line 133 is formed of copper, aluminum, or equivalent wire, while the battery 127 may be formed with lithium, lead acid, or equivalent energy storage compositions. As discussed above, power stored in the battery 127 is used to send and receive power from the first motor coil 43, the second motor coil 45, the first generator coil 51, and the second generator coil 53 (e.g., FIG. 1). As the first motor coil 43 and the second motor coil 45 rotate, the first half shaft 23 and the second half shaft 25 rotate causing the first wheel 27 and the second wheel 29 to rotate as well.

In addition to the battery 127, the DHE 11 receives fuel via a fuel supply line 135 from a fuel tank 137. The fuel tank 137 stores combustible fuel, such as gasoline, hydrogen gas, propane, or equivalent liquids. The fuel is used by the DHE 11 to create a combustion reaction within the combustion chambers 87, and is ignited therein with the aid of the spark plug assembly 71. As discussed above, the combustion reaction in the combustion chambers 87 causes pistons 101 to rotate a crankshaft 13, which, in turn, rotates the first half shaft 23 and second half shaft 25 to rotate the first wheel 27 and the second wheel 29. Thus, the DHE 11 is capable of being driven under the power of a combustion reaction, power stored in the battery 127, or a combination thereof.

To determine the operating mode (e.g., the first, second, and third modes described above), the DHE 11 is connected to an Electronic Control Unit (ECU) 139 via a bus 141. As used herein, the ECU 139 is one or more processors, microprocessors, logic units, controllers, and/or integrated circuits that receive, process, and transmit operating commands to actuate the vehicle 125. The ECU 139 may be coupled to any number of auxiliary devices such as data storage means that retains the operating mode of the DHE 11, transceivers to facilitate receiving and transmitting the operating mode, and/or sensors that receive data on the operating conditions of the DHE 11, for example, without departing from the nature of this disclosure.

On the other hand, the bus 141 is a series of wires, optical fibers, printed circuits, or equivalent structures for transmitting signals between computing devices. Furthermore, although described above as a physical connection, the bus 141 may alternatively be embodied as a virtual network connection between computing devices, such as Wi-Fi, Bluetooth, Zigbee (trademarked), Long-Term Evolution (LTE), 5th Generation (5G), or other equivalent forms of networking communication. Thus, the bus 141 forms one or more transmitter(s) and receiver(s) between the various components described herein.

The ECU 139 may determine the operating mode of the DHE 11 according to one or more factors. Specifically, the ECU 139 may receive instructions from an operator of the vehicle 125 that selects an operating mode, using a mode selection dial (not shown) in the vehicle 125 for example, in which case the ECU 139 obeys the operator's instructions. Alternatively, the ECU 139 may derive the operating mode from the current driving conditions of the vehicle 125. For example, if the ECU 139 detects that the vehicle 125 is being driven at a low rate of speed, the ECU 139 may operate the DHE 11 solely with power from the battery 127 to reduce emissions of the vehicle 125. Furthermore, if the ECU 139 determines that a throttle (not shown) of the vehicle 125 is fully open, the ECU 139 may operate the DHE 11 with both battery power and combustion power to ensure that a maximum power is output by the DHE 11. Thus, the selection of the operating mode depends upon the environment and location of the vehicle 125, among other factors.

Turning to FIG. 9, FIG. 9 depicts a flowchart of a method for operating a hybrid machine in accordance with one or more embodiments described herein. Steps of the flowchart shown in FIG. 9 may be performed by a Dedicated Hybrid Engine (DHE) as described herein, but are not limited thereto. The constituent steps of the method depicted in FIG. 9 may be performed in any logical order, and the method is not limited to the sequence presented.

In step 910 of the method, a DHE 11 receives air from its external environment. In this step, air is drawn through intake ports 73 of the DHE 11 by creating a low pressure region in a combustion chamber 87 of the DHE 11. To create the low pressure region, a piston 101 is actuated in the combustion chamber 87 during an intake phase of an engine cycle of the DHE 11, which expands the volume of the combustion chambers 87 causing the low pressure region to develop. It is noted that additional or alternative methods of drawing air into the combustion chambers 87 falls within the scope of this disclosure, and may include operating valves, throttles, or other components (not shown) attached to the DHE 11.

Once the combustion chamber 87 is at least partially full of air, fuel is drawn or injected into the combustion chamber 87. Such may be facilitated, for example, by operating a fuel injector (not shown) belonging to a spark plug assembly 71 of the DHE 11. Fuel that is injected into the combustion chamber 87 is mixed with the air of the combustion chambers 87 in step 920 of the method. This process may be passive, if the air mixes with the fuel as a result of the fuel's exit velocity from an injector, or active, if the mixing process is facilitated by a piston 101 of the DHE 11. Furthermore, the process of mixing the air and fuel may be a combination thereof, where fuel is passively dispensed in the combustion chambers 87 and actively mixed with a piston 101. Regardless of the mixing method, the action of mixing the air and fuel creates an air and fuel mixture in the combustion chambers 87.

In step 930, the air and fuel mixture is combusted. The combustion reaction is facilitated by a spark plug assembly 71, where spark plugs (not shown) of the spark plug assembly 71 are powered from the battery 127 to create a spark inside of the combustion chambers 87. Alternatively, the DHE 11 may be operated in a combustion ignition mode, where the air and fuel mixture is compressed by a piston 101 to the point that the mixture self-ignites. In either case, the combustion reaction expands to fill the combustion chambers 87, which concludes step 930.

In step 940, the combustion reaction actuates a piston 101 of the combustion chamber 87. Specifically, the expansion of the mixture and its burnt gases resulting from the combustion reaction causes pressure to develop in the combustion chamber 87. This pressure actuates the piston 101, which expands the volume of the combustion chamber 87 to balance the pressure changes. The piston 101 is connected to a crankshaft 13 of the DHE 11, and, thus, when the piston 101 actuates, the crankshaft 13 actuates as well.

After the combustion reaction is completed, exhaust gases are expelled from the DHE 11 in step 950. Specifically, once the piston 101 has reached its lowest point of actuation in the combustion chamber 87, the piston 101 returns to the top of the combustion chamber 87. This phase of the engine cycle is referred to as the "exhaust phase", as the piston 101 forces exhaust gases of the DHE 11 to exit via an exhaust port 89 of the DHE 11. Thus, the combustion cycle of the DHE 11 is completed with the expulsion of the exhaust gases, and the method may restart at step 910 to create a new combustion reaction.

Steps 910-950, above, are directed towards operating the DHE 11 using a combustion reaction. On the other hand, steps 960 and 970 are directed towards operating the DHE 11 with electrical power. In particular, step 960 comprises supplying power to a first motor coil 43 and a second motor coil 45 of the DHE 11. As power is supplied to the first motor coil 43 and the second motor coil 45, the first motor coil 43 and the second motor coil 45 each generate an electromagnetic field. The electromagnetic fields interact with a first hub 39 and a second hub 41 of the DHE 11, which are magnetized and, thus, rotate due to the electromagnetic field.

In juxtaposition to step 960, step 970 includes rotating a first sun gear shaft 63 and a second sun gear shaft 65 of the DHE 11 to generate power. Specifically, the first sun gear shaft 63 and the second sun gear shaft 65, which surround the crankshaft 13 in a radial direction, are respectively surrounded by a first generator coil 51 and a second generator coil 53, and are actuated by motion from the crankshaft 13 and/or the first motor coil 43 and second motor coil 45 of the DHE 11. The rotation of the first sun gear shaft 63 and the second sun gear shaft 65 causes a rotating electromagnetic field that interfaces with the first motor coil 43 and the second motor coil 45, which generates electricity that is transmitted to the battery 127.

The method concludes with step 980, where power is transmitted from at least one of the crankshaft 13, the first motor coil 43, the second motor coil 45, the first generator coil 51, and/or the second generator coil 53 of the DHE 11 to a first wheel 27 and a second wheel 29. It is noted that the DHE 11 may be operated in multiple modes as described herein, and it is not necessary (although still possible as described above) for a DHE 11 to be operated with both battery power and fuel power to actuate the first wheel 27 and the second wheel 29. That is, the DHE 11 may receive only battery power, or only fuel power, and still actuate the first wheel 27 and second wheel 29.

Structurally, the first wheel 27 is connected to a first epicyclic geartrain 19 that interconnects the crankshaft 13, the first motor coil 43, and a first sun gear shaft 63 actuated by the first generator coil 51. Thus, as one or more of the first motor coil 43, the crankshaft 13, and the first generator coil 51 are powered, the first epicyclic geartrain 19 rotates, which, in turn, rotates the first wheel 27. Similarly, the second wheel 29 is rotated by a second epicyclic geartrain 21 that interconnects the crankshaft 13, the second motor coil 45, and a second sun gear shaft 65 actuated by the second generator coil 53. Overall, this causes the vehicle 125 to be driven as a result of the motion of the first wheel 27 and the second wheel 29, as a direct result of the actuation of the DHE 11.

Although only a few example embodiments have been described in detail above, those skilled in the art will readily appreciate that many modifications are possible in the example embodiments without materially departing from this invention. For example, although the disclosure describes the DHE as being transversely mounted, the DHE may be oriented in the radial direction. Furthermore, the DHE may power the rear wheels of the vehicle rather than the front wheels, or may be disposed in the center of the vehicle rather than being in line with an axle. Moreover, and as described above, the DHE may include an overhead camshaft design, where the overhead camshaft replaces the functionality of the pushrods in the DHE. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112(f) for any limitations of any of the claims herein, except for those in which the claim expressly uses the words 'means for' together with an associated function.

What is claimed is:

1. A hybrid machine, comprising:
an engine configured to generate power from a combustion reaction, the engine comprising:
an intake port configured to receive air from an external environment of the engine;
a combustion chamber that receives the air from the intake port and mixes the air with fuel to create an air and fuel mixture that is ignited to create the combustion reaction;
a piston that is configured to actuate from the combustion reaction to rotate a crankshaft of the engine;
an exhaust port configured to deliver exhaust gases from the combustion reaction out of the engine;
a first motor comprising a first hub, the first hub being configured to rotate when power is supplied thereto;

a second motor comprising a second hub, the second hub being configured to rotate when power is supplied thereto;
a first generator configured to generate power when a first shaft of the first generator is rotated;
a second generator configured to generate power when a second shaft of the second generator is rotated;
a first geartrain connected to the first motor, the first generator, and the crankshaft of the engine, the first geartrain being configured to transmit a first amount of power to a first wheel, and
a second geartrain connected to the second motor, the second generator, and the crankshaft of the engine, the second geartrain being configured to transmit a second amount of power to a second wheel,
wherein the crankshaft is disposed on a transverse axis that extends through a center of the first motor and a center of the first generator.

2. The hybrid machine of claim 1, wherein the hybrid machine is symmetrical about a radial axis thereof such that a first half of the hybrid machine comprising the first motor, the first generator, and a first portion of the crankshaft is configured in a same orientation as that of a second half of the hybrid machine comprising the second motor, the second generator, and a second portion of the crankshaft of the engine.

3. The hybrid machine of claim 1, wherein:
the first motor comprises the first hub and a first motor coil, the first motor coil being configured to generate an electromagnetic field that surrounds the first hub, and
the second motor comprises the second hub and a second motor coil, the second motor coil being configured to generate an electromagnetic field that surrounds the second hub.

4. The hybrid machine of claim 1, wherein the first motor forms an exterior of the first geartrain, and the second motor forms an exterior of the second geartrain.

5. The hybrid machine of claim 1, wherein the engine is transversely oriented such that the engine primarily extends in a direction orthogonal to a path of motion of the first wheel and the second wheel.

6. The hybrid machine of claim 1, wherein the first amount of power transmitted by the first geartrain is different from the second amount of power transmitted by the second geartrain.

7. The hybrid machine of claim 1, wherein the first shaft of the first generator and the second shaft of the second generator surround the crankshaft in a radial direction.

8. The hybrid machine of claim 1, wherein the first geartrain and the second geartrain are planetary gearsets.

9. The hybrid machine of claim 8, wherein the first hub is fixed to a ring gear of the first geartrain.

10. The hybrid machine of claim 8, wherein the first shaft of the first generator connects to a sun gear of the first geartrain.

11. The hybrid machine of claim 8, wherein the crankshaft connects to a carrier gear of the first geartrain.

12. The hybrid machine of claim 11, wherein the carrier gear connected to the crankshaft connects to a planet gear of the first geartrain.

13. The hybrid machine of claim 1, wherein the engine comprises a camshaft configured to actuate one or more pushrods that control an amount of fluid transmitted through the intake port and the exhaust port of the engine.

14. The hybrid machine of claim 13, wherein the engine comprises a crankshaft timing gear that is fixed to the crankshaft, the crankshaft timing gear being configured to rotate a camshaft timing gear that is fixed to the camshaft.

15. The hybrid machine of claim 1, wherein the engine comprises an engine block that forms the combustion chamber, and the engine block is integrally formed as a single block of material.

16. The hybrid machine of claim 15, wherein the piston is fixed to a crankshaft cover that is fixed to the engine block.

17. The hybrid machine of claim 15, wherein the engine block comprises a first geartrain compartment configured to receive the first geartrain and a second geartrain compartment configured to receive the second geartrain.

18. An assembly, comprising:

A hybrid machine, comprising:

an engine configured to generate power from a combustion reaction, the engine comprising:

an intake port configured to receive air from an external environment of the engine;

a combustion chamber that receives the air from the intake port and mixes the air with fuel to create an air and fuel mixture that is ignited to create the combustion reaction;

a piston that is configured to actuate from the combustion reaction to rotate a crankshaft of the engine;

an exhaust port configured to deliver exhaust gases from the combustion reaction out of the engine;

a first motor comprising a first hub, the first hub being configured to rotate when power is supplied thereto;

a second motor comprising a second hub, the second hub being configured to rotate when power is supplied thereto;

a first generator configured to generate power when a first shaft of the first generator is rotated;

a second generator configured to generate power when a second shaft of the second generator is rotated;

a first geartrain connected to the first motor, the first generator, and the crankshaft of the engine, the first geartrain being configured to transmit a first amount of power to a first wheel, and a second geartrain connected to the second motor, the second generator, and the crankshaft of the engine, the second geartrain being configured to transmit a second amount of power to a second wheel, wherein the crankshaft is disposed on a transverse axis that extends through a center of the first motor and a center of the first generator;

a fuel tank connected to the hybrid machine, the fuel tank being configured to deliver the fuel to the engine, and a battery connected to the hybrid machine, the battery being configured to transmit and receive power from the first generator, the second generator, the first motor, and the second motor.

19. A method for operating a hybrid machine, the method comprising:

receiving air from an external environment of an engine;

mixing the air with fuel to create an air and fuel mixture;

igniting the air and fuel mixture to create a combustion reaction in the engine;

actuating a piston with the combustion reaction, thereby rotating a crankshaft of the engine;

delivering exhaust gases from the combustion reaction out of the engine;

supplying power to a first motor to rotate a first hub of the hybrid machine;

supplying power to a second motor to rotate a second hub of the hybrid machine;

rotating a first shaft of a first generator to generate power;

rotating a second shaft of a second generator to generate power;

transmitting a first amount of power from at least one of the first motor, the first generator, and the crankshaft of the engine to a first wheel, and transmitting a second amount of power from at least one of the second motor, the second generator, and the crankshaft of the engine to a second wheel, wherein the crankshaft is disposed on a transverse axis that extends through a center of the first motor and a center of the first generator.

* * * * *